J. J. DENNING.
FIRELESS LEER.
APPLICATION FILED JAN. 21, 1914.
1,132,459.
Patented Mar. 16, 1915.
2 SHEETS—SHEET 2.
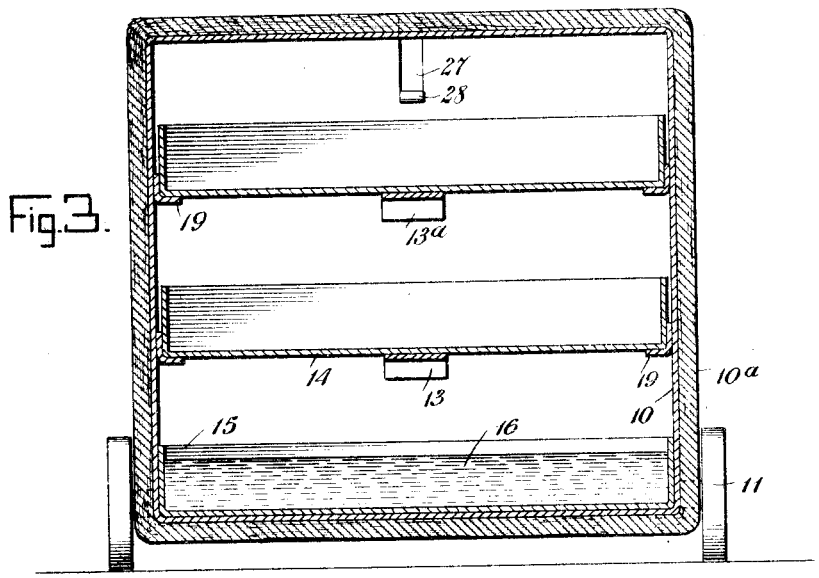
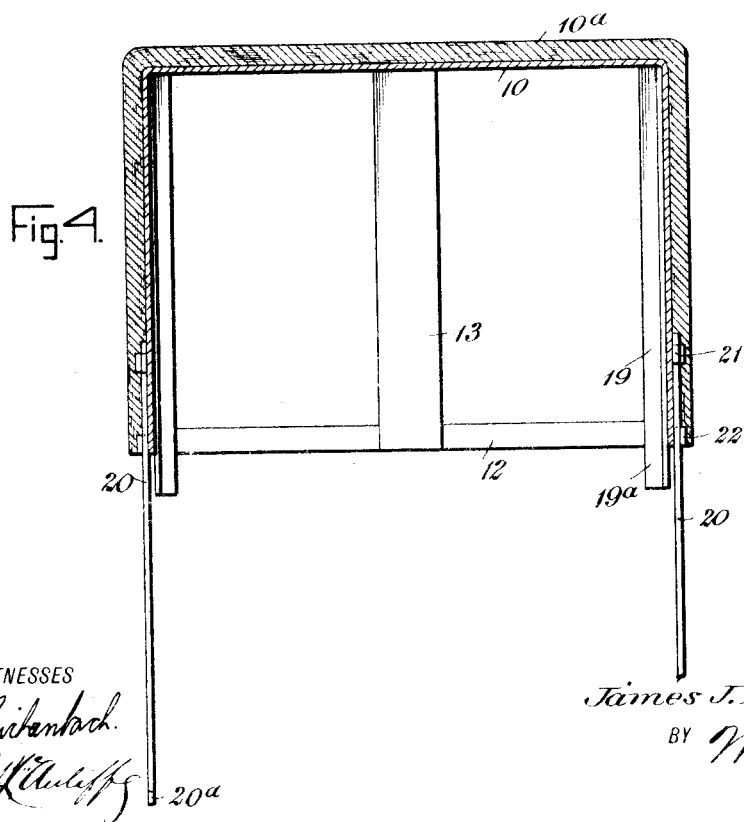
WITNESSES
INVENTOR
James J. Denning
BY
ATTORNEYS

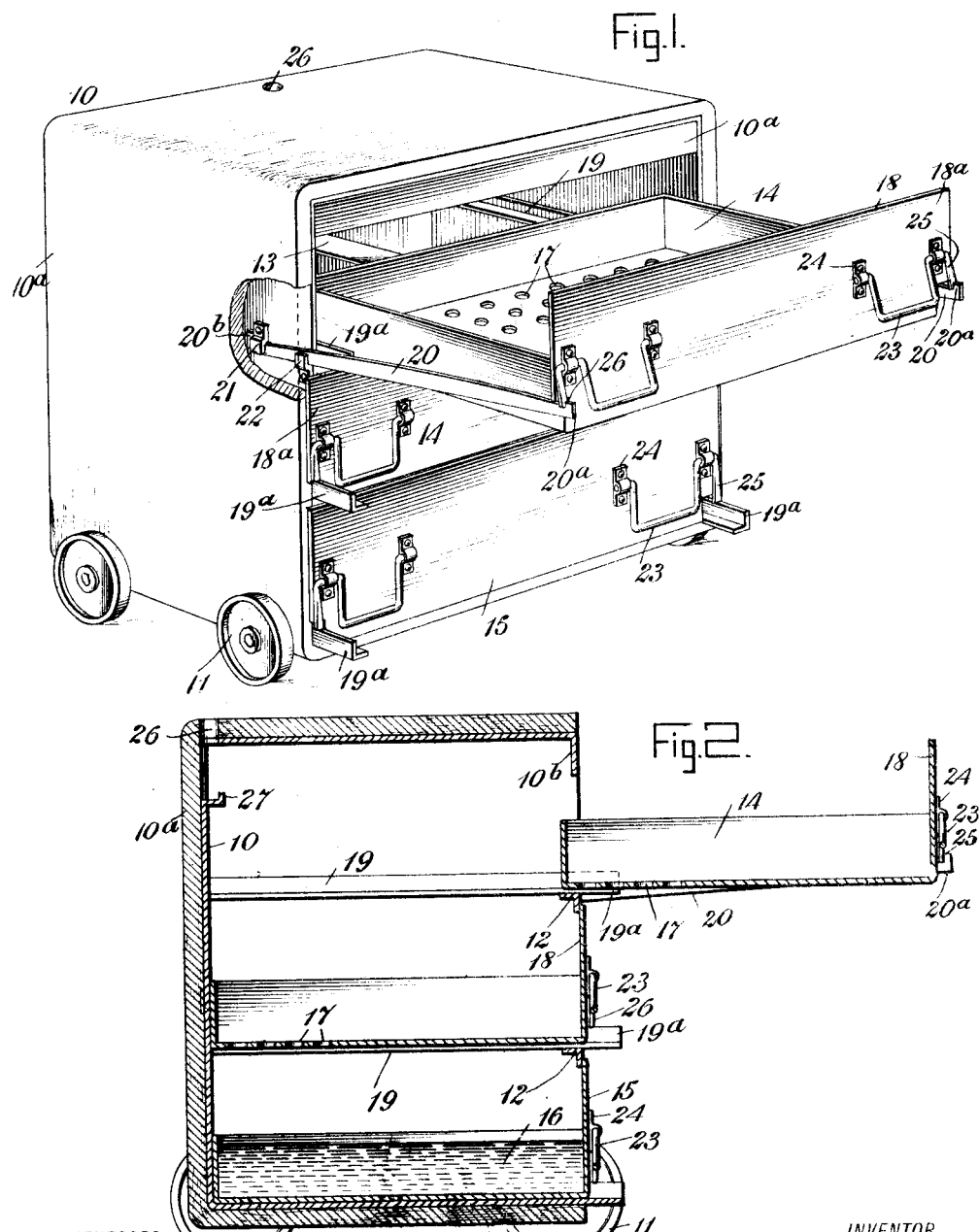

UNITED STATES PATENT OFFICE.

JAMES JOHN DENNING, OF GAS CITY, INDIANA.

FIRELESS LEER.

1,132,459.  Specification of Letters Patent.  Patented Mar. 16, 1915.

Application filed January 21, 1914. Serial No. 813,450.

*To all whom it may concern:*

Be it known that I, JAMES J. DENNING, a citizen of the United States, and a resident of Gas City, in the county of Grant and State of Indiana, have invented a new and Improved Fireless Leer, of which the following is a full, clear, and exact description.

My invention relates to a portable leer or annealing oven for glass ware, more particularly intended for tumblers, glass dishes, goblets and the like. By the usual way of handling glass ware it is liable to crack from sudden changes of temperature, and to become discolored and defective, owing to the products of combustion and impurities produced by the usual heating means.

According to my invention, a quantity of molten glass is utilized for annealing a previously formed quantity of glass ware, and after parting with its heat to carry out the annealing process, the mass is utilized as cullet.

The construction and arrangement of the leer is particularly designed for effectively utilizing the heat of the molten glass for annealing.

The invention will be more particularly explained in the specific description following.

Reference is to be had to the accompanying drawings forming a part of this specification, in which similar characters of reference indicate corresponding parts in all the views.

Figure 1 is a perspective view of a leer constructed in accordance with my invention, parts being broken away; Fig. 2 is a transverse vertical section; Fig. 3 is a transverse vertical section taken at right angles to Fig. 2; and Fig. 4 is a sectional plan view.

In constructing a leer in accordance with my invention a suitable casing or receptacle 10 is provided, having a covering $10^a$ of asbestos or equivalent heat-insulating material. Said receptacle is closed except at the front, which is open. Running wheels 11 are provided in suitable number. A series of racks 12 are provided, approximately rectangular, which may have a central cross bar 13, and these racks are adapted to support annealing pans 14, for receiving the articles of glass ware to be annealed. Supported on the bottom of the receptacle 10 below the pans is an additional pan or drawer 15, which is adapted to hold a supply of molten glass 16. The drawer 15 may correspond in form with the pans except that the latter have perforations 17 to permit the free circulation of air. The pans 14 and drawer 15 have the front 18 extended upwardly beyond the body of the pans. Thus the upper pan 14 will overlap the adjacent depending member $10^b$ of the receptacle 10, and the lower pans and drawers will overlap the adjacent racks 12. The fronts of the pans are also extended at the ends to overlap the body of the receptacle 10, whereby to effect a proper closure of the open front of the receptacle. On the racks 12, at the sides, angle irons 19 or equivalent elements are secured, and these project at the front, as at $19^a$, beyond the body of the receptacle 10, so as to support the rear ends of the pans when the latter are completely withdrawn.

In order to furnish additional support for the pans when in the outer position, and particularly with respect to supporting the outer ends of the pans, movable bars 20 are provided, adapted to detachably engage reversely disposed brackets or keepers 21, 22, on the side of the receptacle 10. The keepers 21 are shown see Fig. 1 particularly, as disposed downwardly, while an adjacent keeper 22 is disposed upwardly. Thus the bars 20 may be engaged with the keepers and will have a length to project by their outer ends beyond the fronts of the pans when the latter are withdrawn, as in Fig. 1. The ends of each bar 20 are upturned, as at $20^a$, $20^b$, the inner member $20^b$ being adapted to have hooked engagement with a keeper 21. To engage the outer members $20^a$ of the bars 20, the drawers have crank handles 23, rockable in bearings 24 on the pans, and each handle has a crank arm 25, the free end of which is adapted to be rocked to a bearing against the adjacent bar 20. Thus the drawer will be supported in the outer position and adapted to conveniently receive the articles of glass ware.

The glass ware is first placed at the rear of the pan and the latter gradually into the receptacle 10 as rapidly as additional lines of glass ware are placed in position, it being understood that the mass of molten glass 16 is first placed in the drawer 15. When a pan is closed the auxiliary supporting bars 20 may be removed. When in the inner position the handles of a pan may be rocked to cause the crank arms 25 of the handles to bear against the projecting ends 19ᵃ of the angle irons 19, to hold the drawer closed. In practice, the receptacle 10 and the asbestos covering thereof will have an inlet opening 26 leading to a rest 27 for the reception of a thermometer (not shown).

By employing a mass of molten glass in the leer as described, to furnish the annealing heat, I am enabled to overcome very serious defects in ordinary annealing apparatus and methods, in that my invention prevents the glass ware from becoming sulfured, as occurs from the fire or heating means of ordinary methods, and I prevent the cracking of the glass ware from sudden changes of temperature, since the molten glass, in addition to furnishing the necessary annealing heat, possesses the advantage that it will gradually give up its heat so that there is a gradual reduction of the temperature of the annealed ware, and the opening of the leer and removal of the ware will not result in any violent change of temperature. The invention besides producing a better and clearer quality of glass ware, promotes economy of labor, in addition to lessening the loss by cracking.

Having thus described my invention, I claim as new and desire to secure by Letters Patent:

1. A leer comprising a receptacle, and a slidable annealing pan, said receptacle having a supporting member projecting forwardly at the front, and the pan having a member rockable relatively to the pan into engagement with the projecting member when the pan is in the inner position.

2. A leer comprising a receptacle, a pan rest projecting forward beyond the front of the receptacle at the sides, an annealing pan in the receptacle, and a device rockable on the pan into engagement with one of the said projecting pan rests.

3. In a leer, a casing, a slidable annealing pan, fixed rests on the casing at the front, auxiliary supporting bars of a length to project forwardly beyond the fixed rests, means to removably secure said bars, and means on the pan and rockable thereon to engage the said bars.

4. In a leer, a receptacle, an annealing pan therefor, rockable handles on the pan, said handles having crank arms, and members on the receptacle at the front, engageable by the said crank arms.

5. In a leer, a receptacle having racks therein, annealing pans on the racks, angle bars associated with the racks at the sides and projecting at the front of the receptacle, and auxiliary supports for the pans, said supports being disposed at the sides of the receptacle adjacent to the angle bars and projecting beyond the latter.

In testimony whereof I have signed my name to this specification in the presence of two subscribing witnesses.

JAMES JOHN DENNING.

Witnesses:
   CORNELIUS J. McHENRY,
   FRED. J. NUNN.